(12) United States Patent
Mischler

(10) Patent No.: US 6,550,969 B1
(45) Date of Patent: Apr. 22, 2003

(54) CARRIAGE FOR LINEAR GUIDING DEVICE

(75) Inventor: Ernst Mischler, Roggwil (CH)

(73) Assignee: Schneeberger Holding AG, Roggwil (CH)

( * ) Notice: Subject to any disclaimer, the term of this patent is extended or adjusted under 35 U.S.C. 154(b) by 0 days.

(21) Appl. No.: 09/762,072

(22) PCT Filed: Jul. 23, 1999

(86) PCT No.: PCT/CH99/00341

§ 371 (c)(1),
(2), (4) Date: Jan. 31, 2001

(87) PCT Pub. No.: WO00/08344

PCT Pub. Date: Feb. 17, 2000

(30) Foreign Application Priority Data

Jul. 31, 1998 (CH) .................................................. 1617/98

(51) Int. Cl.[7] .............................................. F16C 29/06
(52) U.S. Cl. ............................................. 384/44; 384/45
(58) Field of Search .......................... 384/45, 13, 44, 384/57, 29, 52, 38; 29/898.03, 898.12, 460, 527.1

(56) References Cited

U.S. PATENT DOCUMENTS

| | | | | |
|---|---|---|---|---|
| 4,441,765 A | * | 4/1984 | Kasai et al. ................... | 384/45 |
| 4,576,420 A | * | 3/1986 | Lehmann et al. .............. | 384/45 |
| 4,659,239 A | * | 4/1987 | Teramachi ..................... | 384/45 |
| 4,743,125 A | * | 5/1988 | Dammel et al. ............... | 384/117 |
| 4,749,284 A | * | 6/1988 | Teramachi ..................... | 384/45 |
| 5,044,780 A | * | 9/1991 | Teramachi ..................... | 384/44 |
| 5,090,821 A | * | 2/1992 | Tsukada ........................ | 384/44 |
| 5,102,235 A | * | 4/1992 | Mugglestone ................. | 384/43 |
| 5,161,896 A | | 11/1992 | Höfling et al. | |
| 5,429,439 A | * | 7/1995 | Hsu et al. ...................... | 384/13 |
| 5,553,945 A | * | 9/1996 | Blaurock et al. .............. | 384/10 |
| 5,584,581 A | * | 12/1996 | Keller et al. ................... | 384/13 |
| 5,755,516 A | * | 5/1998 | Teramachi et al. ......... | 29/898.03 |
| 5,800,064 A | | 9/1998 | Ohya | |
| 5,980,111 A | * | 11/1999 | Sasaki ............................ | 384/13 |
| 6,045,265 A | * | 4/2000 | Shirai et al. ................... | 384/45 |
| 6,094,819 A | * | 8/2000 | Teramachi et al. ........... | 264/273 |

FOREIGN PATENT DOCUMENTS

FR    2 434 955    3/1980

* cited by examiner

Primary Examiner—David A. Bucci
Assistant Examiner—Julie K. Smith
(74) Attorney, Agent, or Firm—Venable; Norman N. Kunitz; John H. Kim

(57) ABSTRACT

A carriage for a linear guiding device, designed to be arranged on a rail. The carriage includes a center section and two legs that each join the center section, thus providing the carriage with an essentially U-shaped design. The carriage further includes a support region as well as two deflector channels that connect the return channel and the support region, sleeve-shaped guiding elements that are arranged in recesses of a basic body of the carriage, in the return channels. Plastic material is poured in part or totally around one of the two ends of at least one sleeve-shaped guiding elements in order to secure it inside the recess. The sleeve-shaped guiding elements are each provided with centering elements on their outside surfaces, which elements are used to determine the position of a guiding element.

20 Claims, 4 Drawing Sheets

CARRIAGE FOR LINEAR GUIDING DEVICE

BACKGROUND OF THE INVENTION

The invention relates to a carriage for a linear guiding device, designed to be arranged on a rail, said carriage comprising a center section and two legs that respectively adjoin the center section. As a result, the carriage has an essentially U-shaped cross section. In the region of the two legs, the carriage is provided with at least one roll body circuit, one return channel, a support region as well as two deflector channels that connect the return channel and the support region. Sleeve-shaped guiding means are arranged inside a basic body of the carriage, inside return channel recesses, and the guiding means are provided with a running surface for roll bodies.

Linear roll body guides are used in many areas of technology, in which one component is to be moved in a straight line, relative to another one, and if possible without any frictional losses. Machine tools represent one example for this. Guides of that type are provided with a carnage or slide, which is guided on a rail over roll bodies, such as balls, rollers or needles. The roll bodies in that case circulate in closed roll body circuits of the carriage. The roll body circuits normally have a support zone, in which the roll bodies fit against a support surface of the carriage and against a rail, thus supporting the load to be moved. As a result of the linear movement of the carriage, the roll bodies travel from the support zone to a first deflector channel, in which the roll bodies are transferred from the support zone to the return channel. Following the passage through the return channel, the roll bodies travel from a second deflector channel again to the support zone.

The use of plastic parts for the carriage surfaces that come in contact with the roll bodies has long been known, in particular for minimizing the roll body wear and for improving the quiet running of a linear guiding device. German Patent Application 35 40 099, for example, discloses the use of separately produced sleeves for the guiding surfaces of the return channel, which are later inserted into corresponding recesses in the metal basic body of the carriage. It can be considered a disadvantage with this configuration that the sleeves must be manufactured precisely and require an exact and involved assembly. Furthermore, this two-part sleeve design has additional transitions, which can reduce the quiet running.

In addition, German Patent Application 43 31 014 C2 discloses creating the guiding means in the support zones and the return channels by spraying the guide surfaces directly onto the metal basic body of the carriage with the aid of a plastic injection-molding technique. However, the shrinkage occurring in the plastic portion of the return channel when using the injection-molding technique can have disadvantageous effects on the production accuracy. Provided this is possible at all, a considerable expenditure is required to avoid or compensated these occurrences. This type of solution also requires additional anchoring points for the "sprayed-in" sleeve on the basic body. A relatively involved lubricant supply is furthermore needed for the two previously mentioned known carriages.

Thus, it is the object of the invention to create a carriage with a simpler design, relative to its production and assembly, but which nevertheless permits a quiet running. Another aspect of the invention provides for simplifying the lubrication of the roll bodies for this configuration.

SUMMARY OF THE INVENTION

For a carriage of the aforementioned type, this object is solved according to the invention in that the guiding means for the return channels are arranged at a distance to the wall of the respective recess in the basic body, at least along a section.

With a carriage according to the invention for a linear guiding device, the guiding means of the return channel that is preferably designed as a sleeve should be arranged between bearing points and at a distance to the recess, so that a hollow space forms between the guiding means and the recess. Different from the known German reference 35 40 099, for example, the sleeve thus can bend elastically in the recess, crosswise to its longitudinal axis. The degree of bending is limited by the contact between the sleeve and the limiting surface of the recess. A movement of this type can develop, for example, as a result of vibrations or oscillations, caused by the circulating roll bodies inside the sleeve. In contrast to the standard solutions, the return channel for roll body circuits according to the invention is designed such that at least slight vibrations or deflections of the guiding means occur, if possible. Thus, vibrations are purposely taken into account and are used for achieving specific effects.

It has turned out that the elastic bending of the sleeve leads to an improvement in the quiet running of the linear guiding device according to the invention. In addition, the bending can be used for transporting a lubricant that was filled in prior to the start-up of the carriage into the space between the recess and the peripheral surface of the sleeve, over the complete length between the web regions, and which preferably fills this space completely. It has turned out that this space can be sufficiently large to make available a supply of lubricant for the respective roll body circuit, which supply is sufficient for the standard service life of linear guiding devices.

The sleeve wall of a preferred embodiment of the invention contains several openings, through which lubricant can reach the inside of the sleeve. To achieve the best possible lubricant flow, it has proven particularly advantageous if at least one of the openings is arranged in the region of the highest radial deflection for the sleeve. As a rule, this region is located in the center of the sleeve, as seen in longitudinal direction.

Despite the through openings and the elastic deflection ability of the guiding means, the cross sectional shape of the respective return channel should be as constant as possible during the circulation of the roll bodies, so as to ensure a secure and if possible low friction guidance of the roll bodies in the roll body circuit. For that reason in particular, the through openings can extend essentially crosswise to the longitudinal axis of the return channel. In addition, the longitudinal extension of each through opening should extend over no more than half, preferably one fourth, of the periphery of the guiding means.

It has proven to be useful if the guiding means is positioned in the recess in the basic body of the carriage, in the region in-between the two ends and is arranged with its complete outline at a distance to the limiting surface of the recess. As a result, particularly large deflections of the guiding means are achieved, and thus also a particularly good movement of the lubricant to the inside of the guiding means.

Finally, it is preferable if several grooves are inserted along the peripheral surface of the sleeve, which can be used as lubricant pockets. As a result, it is possible to further increase the supply of lubricant that must be inserted in-between the limiting surface of the recess in the basic body and the sleeve, without having to increase the maximum deflection ability of the sleeve. This ability is determined by the gap forming between the recess and the thickest location of the sleeve wall.

It is possible according to another useful embodiment of the invention, that the carriage is provided with a lubricant reservoir, from which lubricant is moved during the use of the carriage into the circular or sleeve-shaped gap between the recess and the sleeve. In contrast to most known carriages, the lubricant in that embodiment does not enter the area where the deflection of the respective roll body circuit occurs, but enters via the return channel.

For another preferred embodiment, plastic is poured around at least one of the two ends of the sleeve-shaped guiding means, which is a component of the deflector channel. Since the guiding means of the return channel are produced preferably together with the retaining means in the support zone, with the aid of an injection-molding technique, the plastic surrounding the sleeve-shaped guiding means on at least one end can also be connected as one piece with the support zone. As a result, the guiding means of the return channel can be centered and secured in the return channel with the same injection molding operation, in which the retaining means and the corresponding part of one or both return channels of a roll body circuit are also produced. In addition, a predetermined distance between the longitudinal axis of the return channel and a longitudinal axis of the support zone can also be maintained particularly easily in this way.

Further preferred embodiments of the invention follow from the description below.

The invention is explained in further detail with the aid of the exemplary embodiments shown schematically in the Figures.

DETAILED DESCRIPTION OF THE INVENTION

Figure 1:
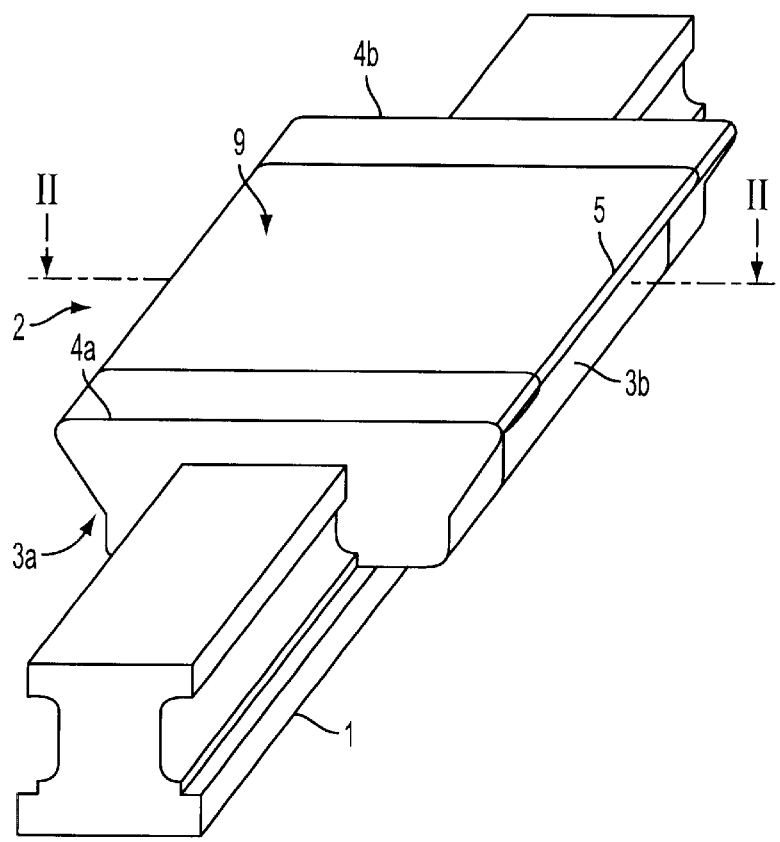
FIG. 1 shows a linear guiding device with a carriage and a rail, shown in a perspective representation.
Figure 2:
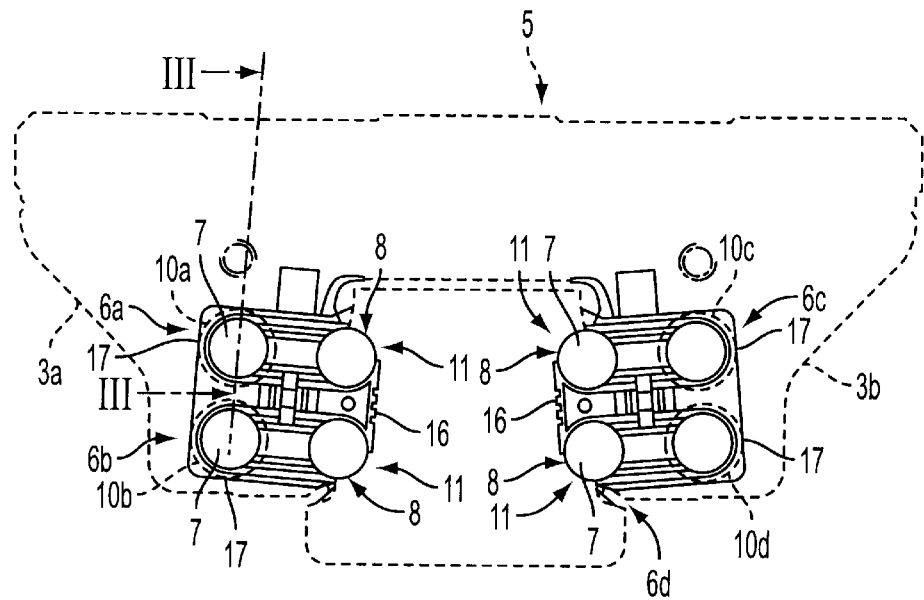
FIG. 2 is a sectional representation of a linear guiding device according to the invention, in a sectional representation along the line II—II of FIG. 1.

FIG. 1 shows a linear guiding device with a profiled guide rail 1, on which a carriage 2 is supported and is arranged such that it can be displaced in a longitudinal direction. FIG. 2 also shows that the carriage 2 is essentially U-shaped in cross section and grips the rail 1 with two legs 3a, 3b that adjoin a center section. Caps 4a, 4b are attached to the carriage fronts and are fastened detachably on a metal basic body 5 of the carriage. One carriage top 2 is provided as a mounting surface 9 for attaching a load that must be moved.

The carriage is supported on side bearing surfaces 8 of the guide rail 1 by means of roll bodies 7, which are arranged in four separate and closed circuits 6a, 6b, 6c, 6d. The exemplary embodiment shown uses balls for the roll bodies 7. The supporting surfaces 8 are profiled, so that a line contact is created between the balls and the guide rail.

Four cylindrical recesses 10a, 10b, 10c, 10d are inserted into the metallic basic body 5, for which the respective longitudinal axis extends parallel to the longitudinal axis of rail 1. Each of these recesses 10a–10d is a component of one of the roll body circuits 6a–6d, which additionally also have a support zone 11 and two deflector channels that respectively connect the ends of the recess and the support zone. The deflector channels are covered by the frontal caps 4a, 4b. The representation in FIG. 2 shows that retaining means 16 are present in the support zone 11, which on the one hand guide the balls and, on the other hand, prevent the balls from falling out of the carriage 2. These retaining means 16 can be "molded directly" onto the basic body by means of an injection-molding technique.

As follows in particular from FIGS. 2 and 3, a guiding means designed as a cylindrical sleeve 17 for the roll bodies is arranged in each recess. The preferably one-piece sleeve 17 that consists of plastic, for example, is provided in the area of each of its two respective ends 18, 19, with four circumferential ridges 21 along the outer peripheral surface 20. Of course, it would also be possible to provide more or fewer than four ridges in each case. Among other things, the ridges 21 are used for centering the sleeve 17 in the respective recess of basic body 5. As a result, a longitudinal axis 26 of the sleeve 17 is aligned with the symmetry axis of the respective recess. The sleeve has a symmetrical design with respect to all (imaginary) planes in which the center longitudinal axis 26 of the sleeve is positioned. The sleeve is furthermore symmetrical to another (imaginary) plane, relative to which the longitudinal axis 26 is aligned orthogonal, dividing the sleeve into two equally long halves.

Between the two ends, that is to say essentially in the center between the two regions where the ridges 21 are arranged, the sleeve 17 is provided on its outer peripheral surface 20 with several grooves 22a, 22b, 22c, 22d, which are distributed evenly over the periphery of the sleeve and extend essentially parallel to the longitudinal axis 26 of sleeve 17. The grooves are respectively limited by a bottom surface 23 as well as side surfaces 24, 25 and function as lubricant pockets. Thus, the invention provides for depositing a supply of lubricant outside of the guiding means, meaning in the area of the peripheral surface of sleeve 17. The length of the grooves approximately amounts to ¾ of the total sleeve length.

A circumferential groove 31, 32 is inserted into a cone-shaped, slanted section 27, 28 of the peripheral surface 20, between the ridges 21 and respectively the two ends 18, 19. Furthermore, each of the two ends is provided with two diametrically opposite arranged slots 33, 34, which respectively end in a circular recess 35, 36 of the wall 37.

The sleeve 17 furthermore contains several through openings 39 in the wall 37, which are tapered in the shape of a funnel and empty into the inside 38 of sleeve 17. Two opposite-arranged side walls of a through opening 39 respectively connect two grooves. Thus, at least two side-by-side arranged grooves are connected in each case via at least one through opening 39 to a lubricant flow toward the inside of sleeve 17. In the exemplary embodiment shown, each groove is connected via five through openings to the inside 38 of the sleeve 17. All through openings 39 are preferably aligned with their longitudinal extension essentially crosswise to the lubricant pockets or the longitudinal axis 26 of the sleeve. The size of the through opening 39 can be matched to the lubricant intended for use, such that a "capillary effect" develops, which is used to transport the lubricant to the inside of sleeve 17. It means that the cross-sectional surface or one width of the through opening can be adapted to the density of a liquid lubricant and thus to the surface stress that develops in the lubricant. As a result, the lubricant is moved in the direction of the sleeve inside owing to the surface stress alone or in combination with another effect, for example; the described sleeve vibrations.

Figure 5:
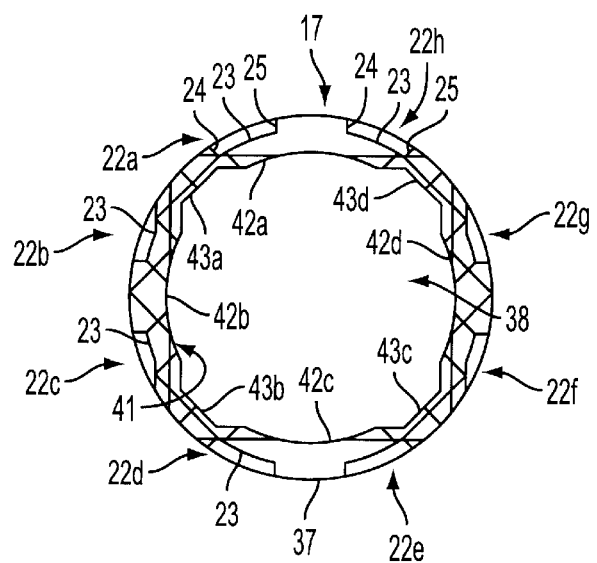
FIG. 5 is a cross-sectional representation of the sleeve in FIG. 4, along the line V—V.
Figure 4:
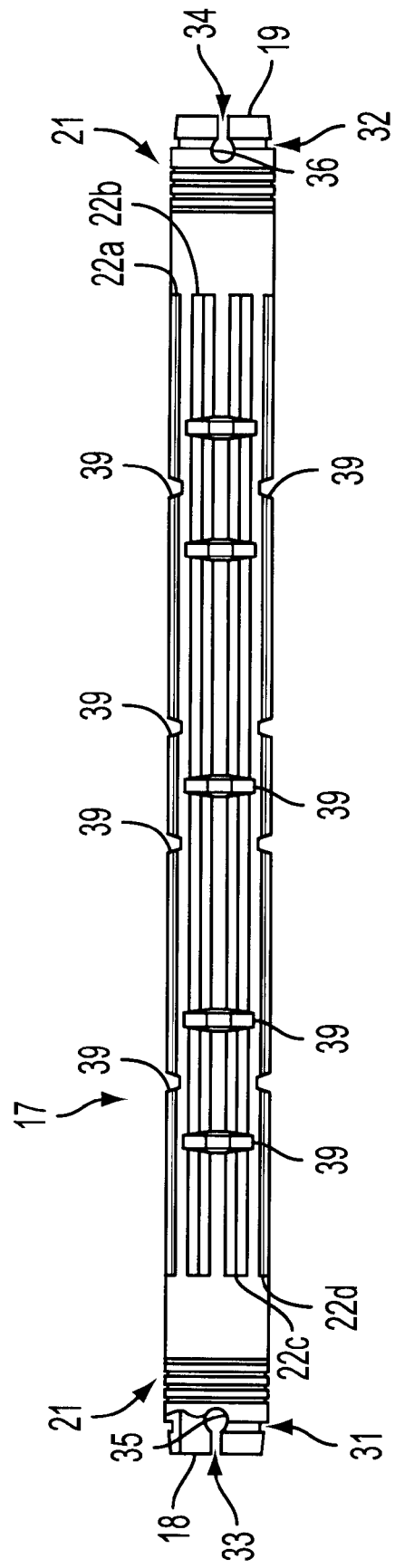
FIG. 4 shows a sleeve-shaped guiding means according to the invention, as seen from the side.

An internal limiting surface 41 of wall 37 is provided for guiding the roll bodies. For this, the limiting surface 41 has an essentially constant cross section over the total length of sleeve 17. The internal limiting surface 41 of the sleeve is profiled as well, thereby deviating from a (completely) circular shape as far as the cross section is concerned. In particular the cross-sectional representation in FIG. 5 shows that the internal limiting surface 41 has several depressions 43*a*, 43*b*, 43*c*, 43*d* between the circular segments 42*a*, 42*b*, 42*c*, 42*d* on which the roll bodies roll off. In the same way as the circular segments 42*a*–42*d*, the depressions 43*a*–43*d* also extend parallel to the center axis. The depressions 43*a*–43*d* function on the one hand to hold lubricant. On the other hand, they make it particularly easy for the balls in the sleeve to roll off because they avoid a jamming of the balls. The balls consequently can be guided easily and an exact, circular cross-section of the inside limiting surfaces is not absolutely necessary.

Figure 3:
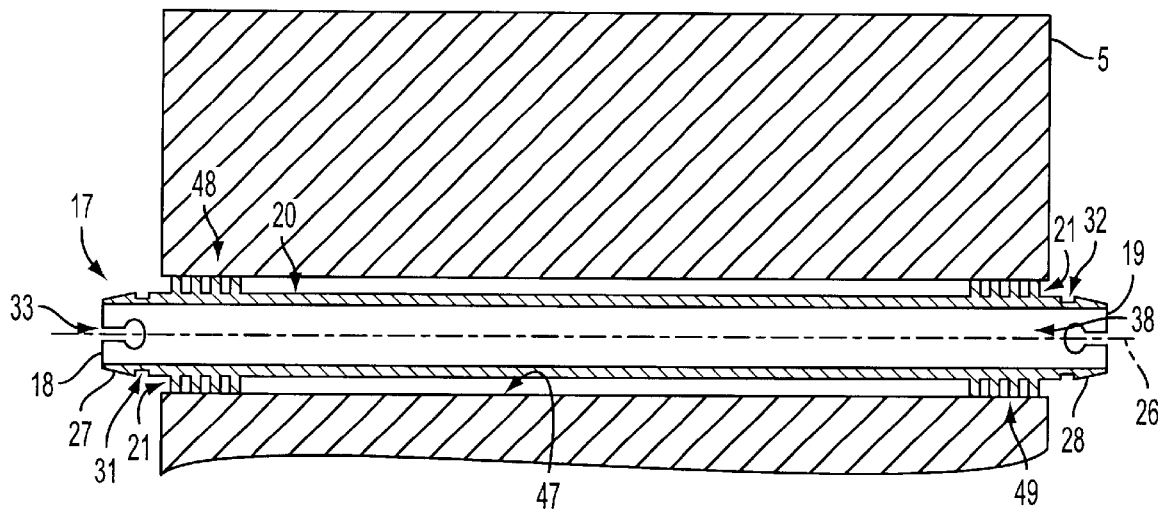
FIG. 3 is a sectional representation of a return channel in the basic body of the carriage in FIG. 2.

In particular the representation in FIG. 3 shows that the sleeve 17, which is mounted in one of the recesses 10*a*–10*d* of the carriage 2, projects with its two cone-shaped ends 18, 19 over the basic body 5. As a result, the respective groove 31, 32 as well as the respective slot 33, 34 with recess 35, 36 are accessible for installing additional carriage components. The slots 33, 34 and the recess 35, 36 respectively form a part of a snap connection. With the aid of the snap connection, a component can be attached to the end of sleeve 17, which component has at least one portion of a deflector channel formed on. In addition, a centering of the sleeve 17, relative to the two deflector channels, can be achieved with this.

The sleeve is fitted with the ridges 21 onto a wall surface 47 of the respective recess 10*a*–10*d* of basic body 5 and is secured thereon against movement along its longitudinal axis, owing to a slight press-on fit between the ridges 21 and the basic body 5 (compare FIG. 3 for example). Between the two areas 48, 49 on which the ridges 21 are arranged, the sleeve 17 with its total peripheral surface is at a distance to the recess 10*a*–10*d*. As a result, the sleeve 17 can bend inside the recess, between the ridge regions 48, 49 and crosswise to its longitudinal axis 26, until its peripheral surface 20 comes in contact with the wall surface 47. A movement of this type can develop, for example as a result of vibrations caused by the circulating roll bodies.

Figure 6:
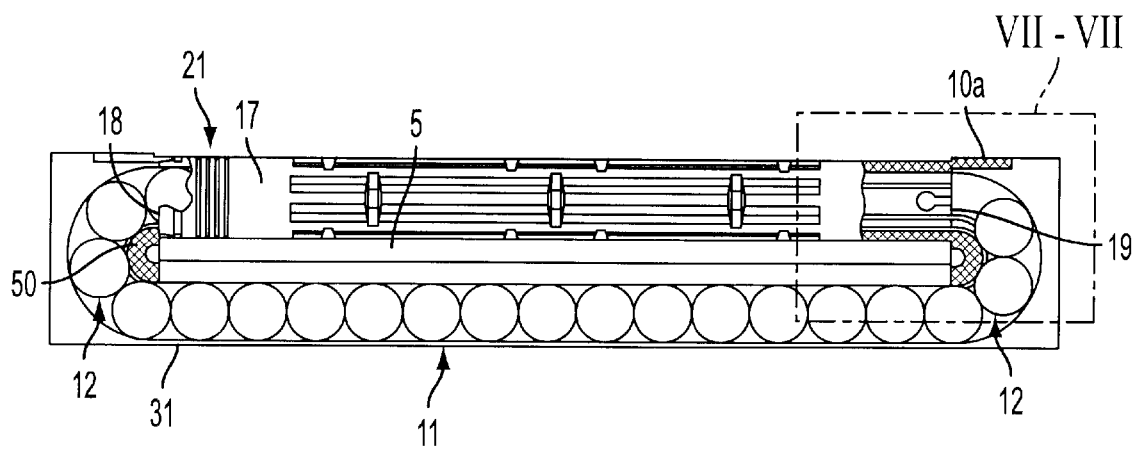
FIG. 6 is a cross-sectional representation through a roll body circuit of an additional carriage according to the invention, showing a partial section of a guiding means for the return channel.
Figure 7:
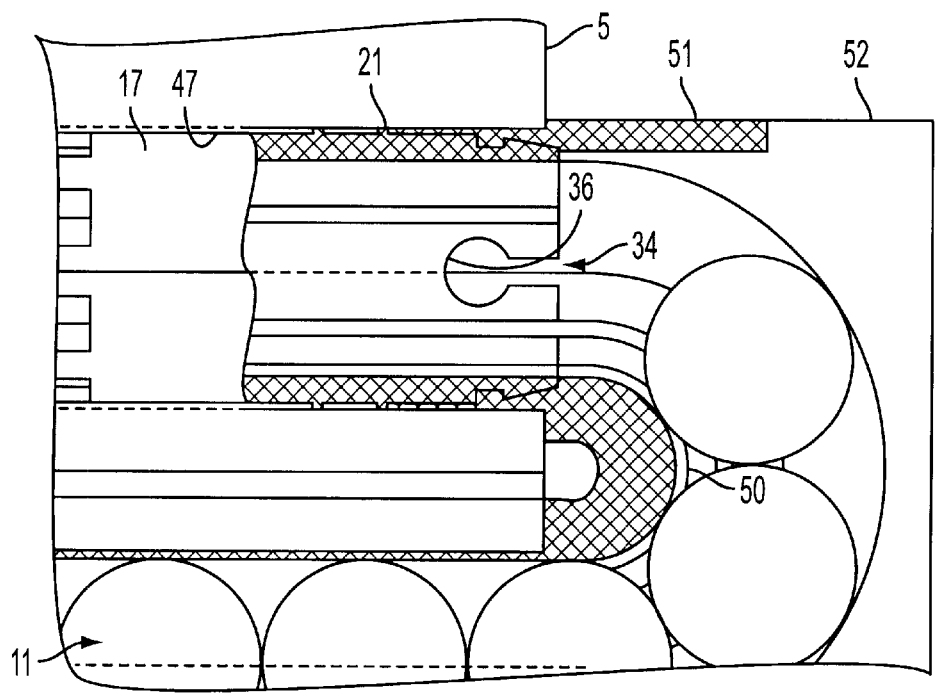
FIG. 7 is an enlarged representation of the detail VII—VII in FIG. 6.

A second embodiment of a roll body circuit according to the invention is shown in FIGS. 6 and 7. For this embodiment, a sleeve that is in principal identical to the one in FIGS. 2 to 5 is arranged in the recess of the return channel. Thus, the following relates only to the differences in the two embodiments, wherein the same reference numbers are used for basically the same elements as for the exemplary embodiment in FIGS. 2 to 5.

One difference is that the sleeve 17 in this case projects less far from the recess 10*a*. Thus, it can be seen in the two FIGS. 6 and 7 that the circumferential grooves 31, 32 are located completely inside the recess 10*a*. In addition, the running surfaces of the support zone 11 that face the carriage side, as well as inside sections of the two deflector channels 12 can be molded directly onto the metal basic body 5 with the aid of a plastic injection-molding technique. It may be preferable for all sleeves 17 to be located in the respective recesses of the return channels when implementing this technique. As a result, the injected plastic can also surround the ends 18, 19 of the sleeves 17 and can additionally secure the sleeves inside the recesses. The plastic then penetrates— as seen from one end of the sleeve—in each case up to the first ridge 21 in the region between the wall surface 47 of the recess and the corresponding sleeve 17.

The fact that the plastic material fills the two circumferential grooves 31, 32 as well as the two slots 33, 34 and the recesses 35, 36 in particular contributes to a secure anchoring and fixation of the sleeve 17 in the recess of the basic body. A movement of the sleeve along its longitudinal axis 26 can be avoided simply through the form-locking connection between sleeve and plastic parts 50, which parts respectively are provided with an internal guiding surface of the deflector channels 12. A centering nose 51 that is connected as one piece to the plastic part 50 of the deflector channel is also produced with the plastic injection-molding technique. This nose functions to center a component 52 with formed-on outer guide surface of the deflector channel 12.

The ridges 21—in particular the respectively first ridge— function as seals to prevent the plastic material from entering the region where the sleeve is to be arranged at a distance to the wall surface. To prevent the plastic material from entering the inside of the sleeve, it is of course necessary to insert a core into the sleeve when injecting the plastic material. This core is removed again once the plastic material has hardened. In addition, the core can be used to ensure a centering of the sleeve in its recess.

It is possible that the circumferential ridges 21 of both exemplary embodiments are interrupted over their complete width (direction along the longitudinal axis 26). In that case, it is preferable if the interruptions in side-by-side arranged ridges—relative to the peripheral direction of sleeve 17—are offset. Despite the interruptions, the ridges then can meet the function of a seal to prevent plastic material from entering the region where the sleeve can be bent. The advantage achieved with this embodiment of the ridges is that the ridges can be deformed elastically and that consequently no high requirements must be met with respect to the production accuracy, for example the diameter of the recess or the ridge.

What is claimed is:

1. A carriage for a linear guiding device, designed to be arranged on a rail, said carriage comprising a center section and two legs that each join the center section, thus providing the carriage with an essentially U-shaped design, and wherein: the carriage is provided with at least one roll body circuit in the area of the two legs and each roll body circuit has a return channel, a support region as well as two deflector channels that connect the return channel and the support region, sleeve-shaped guiding means are arranged in recesses of a basic body of the carriage, in the return channels, each of the guiding means are provided with a running surface for roll bodies, the guiding means for the return channels are arranged at least along a section at a distance to the wall surface of a respective one of the recesses of the basic body, wherein plastic material is poured in part or totally around one of the two ends of at least one sleeve-shaped guiding means in order to secure it inside the recess, the sleeve-shaped guiding means are each provided with centering elements on their outside surfaces, which elements are used to determine the position of a guiding element, relative to a longitudinal axis of the recess in the carriage in which the guiding element is arranged, and the centering elements are arranged in the region of the two outer thirds of the guiding means, relative to the length of the guiding means.

2. A carriage according to claim 1, wherein each of the guiding means are arranged in the region of at least one section along its total periphery, at a distance to the corresponding wall surface of the recess in the carriage.

3. A carriage according to claim 1, wherein at least one of the sleeve-shaped guiding means has at least one lubricant pocket on its wall.

4. A carriage according to claim 3, wherein the lubricant pocket of the one sleeve-shaped guiding means is designed as a groove.

5. A carriage according to claim 3, wherein the at least one lubricant pocket is provided in each section, in which the guiding means is arranged at a distance to the wall surface.

6. A carriage according to claim 1, wherein lubricants are provided in a lubricant pocket in the section where a guiding means is arranged at a distance to the wall surface, and wherein the lubricant pocket is limited by the wall surface of the recess in the basic body and the peripheral surface of the guiding means.

7. A carriage according to claim 6, wherein the lubricant pockets extend in a longitudinal direction essentially parallel to a longitudinal axis of the return channel.

8. A carriage according to claim 1, wherein the guiding means is provided with at least one through opening in its wall.

9. A carriage according to claim 8, wherein a longitudinal extension of the at least one through opening extends essentially crosswise to a longitudinal axis of the sleeve-shaped guiding means.

10. A carriage according to claim 8, wherein the guiding means is flexible and deflections of the guiding means are used to introduce lubricants through the at least one opening in the guiding means.

11. A carriage according to claim 8, wherein lubricants are provided between the wall surface and the guiding means and the at least one through opening is dimensioned such that a capillary effect develops for feeding the lubricant into the guiding means.

12. A carriage according to claim 1, wherein the length of a guiding means is longer than the length of the corresponding recess in the carriage.

13. A carriage according to claim 1, wherein plastic material is poured partially or totally around both ends of at least one sleeve-shaped guiding means for securing it in the recess.

14. A carriage according to claim 13, wherein the plastic that is poured around one end of the at least one sleeve-shaped guiding means forms one piece with a deflector channel.

15. A linear guiding device, comprising a rail and a carriage guided along the rail, having a carriage according to claim 1.

16. A carriage device according to claim 1, wherein the centering elements are ring-shaped and are interrupted in circumsferential direction.

17. A carriage for a linear guiding device, designed to be arranged on a rail, said carriage comprising a center section and two legs that each join the center section, thus providing the carriage with an essentially U-shaped design, and wherein: the carriage is provided with at least one roll body circuit in the area of the two legs and each roll body circuit has a return channel, a support region as well as two deflector channels that connect the return channel and the support region, sleeve-shaped guiding means are arranged in recesses of a basic body of the carriage, in the return channels, each of the guiding means are provided with a running surface for roll bodies, the guiding means for the return channels are arranged at least along a section at a distance to the wall surface of a respective one of the recesses of the basic body, wherein plastic material is poured in part or totally around one of the two ends of at least one sleeve-shaped guiding means in order to secure it inside the recess, the sleeve-shaped guiding means are each provided with centering elements on their outside surfaces, which elements are used to determine the position of a guiding element, relative to a longitudinal axis of the recess in the carriage in which the guiding element is arranged, and the centering elements are designed as ring-shaped centering ridges, which extend over the total periphery of the guiding means.

18. A carriage device according to claim 17, wherein the centering elements are ring-shaped and are interrupted in circumsferential direction.

19. A carriage for a linear guiding device, designed to be arranged on a rail, said carriage comprising a center section and two legs that each join the center section, thus providing the carriage with an essentially U-shaped design, and wherein: the carriage is provided with at least one roll body circuit in the area of the two legs and each roll body circuit has a return channel, a support region as well as two deflector channels that connect the return channel and the support region, sleeve-shaped guiding means are arranged in recesses of a basic body of the carriage, in the return channels, each of the guiding means are provided with a running surface for roll bodies, the guiding means for the return channels are arranged at least along a section at a distance to the wall surface of a respective one of the recesses of the basic body, wherein plastic material is poured in part or totally around one of the two ends of at least one sleeve-shaped guiding means in order to secure it inside the recess, the sleeve-shaped guiding means are each provided with centering elements on their outside surfaces, which elements are used to determine the position of a guiding element, relative to a longitudinal axis of the recess in the carriage in which the guiding element is arranged, and each guiding means is arranged between the centering elements and at a distance to the wall.

20. A carriage device according to claim 19, wherein the centering elements are ring-shaped and are interrupted in circumsferential direction.

* * * * *